United States Patent
Lobiondo et al.

[15] 3,644,125
[45] Feb. 22, 1972

[54] PROCESS FOR PRODUCING COOKED HAMS

[72] Inventors: Salvatore J. Lobiondo, 12 Decamp Court, West Caldwell, N.J. 07006; Joseph V. Lobiondo, 12 Winding Lane, Bloomfield, N.J. 07003

[22] Filed: Jan. 29, 1970

[21] Appl. No.: 6,661

[52] U.S. Cl. .................................99/107, 99/187, 17/1 G
[51] Int. Cl. .................................A22c 18/00, A23b 1/00
[58] Field of Search.................99/107, 187, 194; 17/1 G

[56] References Cited

UNITED STATES PATENTS

| | | | |
|---|---|---|---|
| 3,236,656 | 2/1966 | Wittig | 99/107 |
| 3,497,361 | 2/1970 | Wilco et al. | 99/107 |
| 3,503,755 | 3/1970 | McGowan | 99/107 |
| 3,567,464 | 3/1971 | Stallons | 99/107 |

Primary Examiner—Hyman Lord
Attorney—Harry B. Rook

[57] ABSTRACT

The bone is removed from a ham in known manner and the ham is cut in an axial plane of the hole that was formed when the bone was removed to provide two major integrally connected sections which re relatively moved to dispose their cut surfaces in approximately a common plane. Minor sections are severed from said major sections, after which said cut surfaces of the major sections and said minor sections are macerated. The minor sections are placed between the major sections which are moved into superposed relation to each other with the macerated surfaces of the pieces contacting each other, whereupon the assembly of major sections and minor sections is compressed in a mold and cooked so that the pieces are bonded together with bonds which are practically as strong as the tissue of any of the pieces.

2 Claims, 9 Drawing Figures

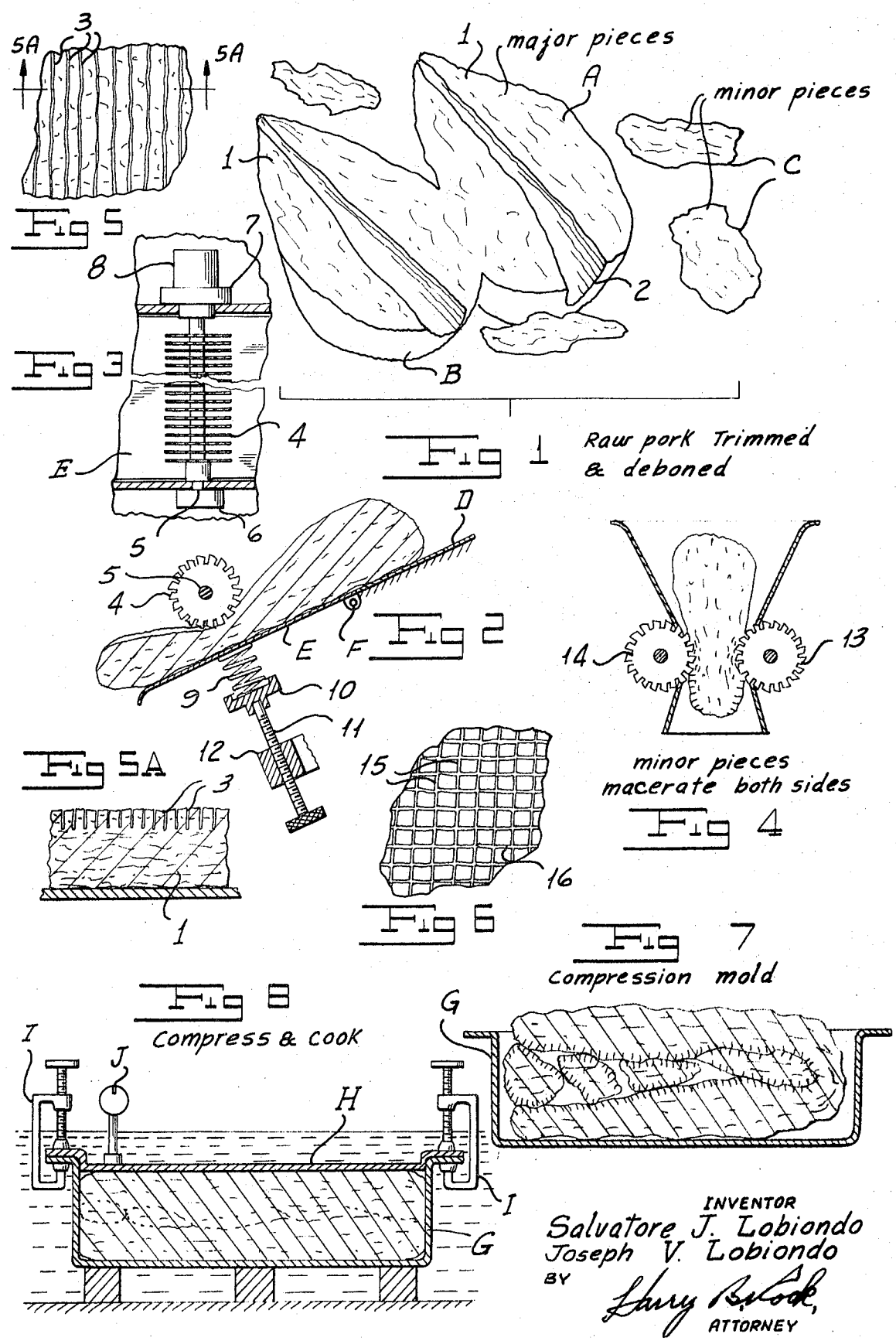

PROCESS FOR PRODUCING COOKED HAMS

BACKGROUND OF THE INVENTION

1. Field of the Invention

The invention relates in general to the preparation of canned meat products and more particularly is directed to a method of producing cooked ham.

2. The Prior Art

One known process comprises the deboning of a ham and then the cutting of it to form two integrally connected sections. Gelatin is spread on the cut surfaces which are then pressed into contact with each other whereupon the ham is compressed and cooked in a mold. However this process leaves much to be desired because the meat pieces are not firmly bonded together but tend to pull apart when the molded composite is sliced; also the gelatin changes the natural flavor of the meat, and the process is expensive.

The tenderizing of pieces of meat by puncturing or slitting of the surfaces of the pieces is also known, and it is known to pin-puncture stacked pieces of meat and then to mold the composite assembly to the desired shape while the assembly is being chilled. However, the pieces are not firmly bonded together even when, as in most instances, the pieces are coated with gelatin.

SUMMARY OF THE INVENTION

A primary object of the present invention is to provide a novel and improved process for preparing pieces of meat firmly bonded together with bonds practically as strong as the tissue of the individual pieces and without the use of gelatin.

The invention particularly contemplates the macerating of the cut surfaces of major sections of a ham that has been deboned and cut in an axial plane of the hole formed by the removal of the bone, and then pressing the macerated cut surfaces into contact with each other and molding and cooking the assembled pieces under pressure.

It is another feature of the invention to macerate the surfaces of minor sections of a ham that are severed during the deboning operation, and compress said macerated minor pieces between the macerated surfaces of the major sections.

BRIEF DESCRIPTION OF THE DRAWINGS

For a more complete understanding of the invention, reference may be had to the following description in conjunction with the accompanying drawing in which:

FIG. 1 is an exploded composite perspective view of a raw ham that has been cut to form two major sections and a plurality of minor sections;

FIG. 2 is a schematic sectional view of one type of apparatus for macerating the cut surfaces of the major sections of the ham;

FIG. 3 is a fragmentary schematic plan view of the macerating apparatus shown in FIG. 2;

FIG. 4 is a similar view of an apparatus for macerating opposite surfaces of the sections, particularly the minor sections;

FIG. 5 is an enlarged fragmentary plan view of the macerated cut surface of the major ham sections;

FIG. 5A is a fragmentary transverse sectional view taken approximately on the plane of the line 5A—5A of FIG. 5;

FIG. 6 is a view similar to FIG. 5 showing another form of maceration;

FIG. 7 is a schematic sectional view of the body portion of a compression mold having the macerated major and minor sections assembled therein;

FIG. 8 is a similar view showing the cover clamped on the body portion of the mold and compressing the ham sections in the mold which is shown as immersed in hot water for cooking the ham.

DESCRIPTION OF THE PREFERRED EMBODIMENT

Specifically describing the invention, a raw ham has the bone removed therefrom in known manner so as to leave a hole in the ham from which the bone has been removed. The deboned ham is then cut in an axial plane of the hole, but preferably not completely through the ham thereby forming two integrally connected major sections A and B which are relatively moved or swung away from each other to expose the cut surfaces 1 in approximately a common plane with half of the hole remaining in each section as indicated at 2. During the cutting of the ham, according to known practice, minor sections C are cut from the ham and temporarily laid aside.

In accordance with the invention the cut surfaces 1 of the major sections are macerated by forming elongated slits or grooves in said surfaces as indicated at 3 in FIGS. 5 and 5A. The sides and edges of the slits are irregular and deformable because the meat is soft during the macerating operation.

Different types of apparatus may be utilized for macerating the major sections, but FIGS. 2 and 3 schematically show one apparatus which comprises a stationary table top D having a table extension E hingedly mounted thereon as indicated at F to swing vertically about a horizontal axis. Above the table extension E are a plurality of circular cutting discs 4 closely spaced apart and secured upon a shaft 5 which is journaled in bearings 6 and 7 on a fixed frame and with which is drivingly connected a motor 8 and suitable speed reducing gearing. The table extension E is yieldably adjustable with respect to the cutting discs by a spring 9 interposed between the extension and a plate 10 which has a swivel connection with an adjusting screw 11 that is screw threaded in a stationary portion 12 of the frame.

In operation, the ham with the major sections spread apart and the cut surfaces 1 facing upwardly, is placed on the table D and pushed between the table extension and the cutting discs while the discs are being rotated as shown in FIG. 2. During this operation, a plurality of elongated slits or grooves 3 are formed in the cut surfaces, and inasmuch as the meat is soft the sides and edges of the slits are irregular and deformable.

The minor sections C are preferably macerated at both sides thereof, for example, by apparatus shown in FIG. 4 which comprises two parallel spaced apart series 13 and 14 of cutting discs like the discs 4 between which the meat sections are passed while the discs are being rotated by the motor or other suitable driving mechanism. Thus, slits are formed on both sides of the minor sections of the ham.

In some cases it may be desirable to provide two series 15 and 16 of slits in the cutting surfaces, the slits of one series being disposed perpendicular to the slits of the other series as shown in FIG. 6.

It will be understood that the width, depth, configuration and spacing of the slits or grooves may be varied as required by different conditions such as meats of different nature or different characteristics.

After the sections have been macerated, the two major sections A and B are relatively moved or swung into superposed relation to each other with the minor sections C disposed between the major sections and with the macerated sections in contact with each other; and the assembled sections are then placed in the body portion G of a known type of compression mold as shown in FIG. 7. Thereupon the cover H of the mold is clamped on the body portion so as to compress the meat sections within the mold as shown in FIG. 8. It will be understood that different types of clamping mechanism can be used but ordinary C-clamps I are shown for clamping together the flanges on the cover and flanges on the body portion; and desirably the cover has a vent valve J. The closed mold is then suspended or set into a tank of hot water in known manner as indicated in FIG. 8 where the meat is cooked.

It will be observed that as the meat sections are compressed in the mold the irregular deformable sides and edges of the slits of one section interlock with the sides and edges of the slits in the adjacent sections, and the meat is cooked with the macerated surfaces in such contact.

The sections are strongly bonded together, it having been found that the bonds between the sections are substantially as strong as the tissue of the individual sections which are bonded together. Therefore, the composite assembly after compressing and cooking thereof can be easily sliced without separation or tearing apart of the several sections. The composite assembly appears to have the physical characteristics of a single piece of meat. Additional advantages of the method are that it eliminates the necessity for gelatin between the sections so that the cost of the gelatin is avoided and the meat is not affected in any manner by gelatin between the sections. It is also possible to utilize much more of the so-called scraps of meat that are ordinarilly wasted according to the earlier practices in the production of canned hams.

We claim:

1. A process for producing cooked hams comprising deboning a raw ham, cutting the ham in an axial plane of the hole formed by the removal of the bone thereby forming two integrally connected major sections, macerating the cut surfaces of said major sections by forming in said surfaces a plurality of approximately parallel closely spaced slits whose edges are deformable so that the edges of the slits in one section interlock with the edges of the slits in the adjacent section when said sections are compressed, and relatively moving the sections into superposed relation to each other to press the macerated surfaces into contact with each other, compressing the assembly of said sections in a mold with said macerated surfaces in such contact so that said sections are interlocked at said macerated surfaces and cooking the assembly while said sections are so compressed.

2. A process for producing cooked hams comprising deboning a raw ham, cutting the deboned ham in an axial plane of the hole formed by the removal of the bone thereby forming two integrally connected major sections, severing minor sections from said major sections, macerating the cut surfaces of the major sections by forming in said surfaces a plurality of approximately parallel closely spaced slits whose edges are deformable so that the edges of the slits in one major section interlock with the edges of the slits in the other major section when said major sections are subsequently compressed, macerating the surfaces of the minor sections by forming slits in both surfaces thereof, placing said minor sections between the major sections which are moved into superposed relation to each other with the macerated surfaces thereof contacting each other, compressing the assembly of major and minor sections in a compression mold whereby the edges of the slits in the contacting macerated surfaces of the major sections are interlocked, and cooking the compressed assembly of major and minor sections in said mold while said sections are so compressed.

* * * * *